US006103826A

United States Patent [19]

Jones et al.

[11] Patent Number: 6,103,826

[45] **Date of Patent: *Aug. 15, 2000**

[54] CLEARCOAT COMPOSITIONS CONTAINING PHENOLIC ESTER COMPOUNDS

[75] Inventors: Frank N. Jones, Ann Arbor, Mich.; Vijay Swarup; Albert I. Yezrielev, both of Houston, Tex.; Ramachandran P. Subrayan, Ypsilanti, Mich.

[73] Assignee: Eastern Michigan University, Ypsilanti, Mich.

[ * ] Notice: This patent is subject to a terminal disclaimer.

[21] Appl. No.: 08/790,079

[22] Filed: Jan. 29, 1997

Related U.S. Application Data

[63] Continuation-in-part of application No. 08/621,171, Mar. 21, 1996, which is a continuation-in-part of application No. 08/424,205, Mar. 19, 1995, Pat. No. 5,681,906, and a continuation-in-part of application No. 08/621,177, Mar. 21, 1996, Pat. No. 5,973,072, and a continuation-in-part of application No. 08/702,966, Aug. 26, 1996, abandoned

[60] Provisional application No. 60/002,063, Aug. 9, 1995.

[51] Int. Cl.[7] .......................... C08L 61/20; C08L 67/00; C08L 75/04; C08G 18/80

[52] U.S. Cl. ......................... 525/123; 525/124; 525/132; 525/329.9; 525/330.5; 525/437; 525/440; 525/443; 525/452; 525/453; 525/454; 525/455; 525/456; 525/457; 525/460; 525/509; 525/518; 525/519; 525/520; 525/528; 528/45; 528/75; 528/80; 528/83; 528/85

[58] Field of Search .................................... 525/123, 124, 525/132, 329.9, 330.5, 437, 440, 443, 452, 453, 454, 509, 455, 518, 456, 519, 457, 520, 460, 528; 528/45, 75, 80, 83, 85

[56] References Cited

U.S. PATENT DOCUMENTS

| | | | |
|---|---|---|---|
| 3,409,579 | 11/1968 | Robins | 523/143 |
| 3,789,044 | 1/1974 | Taft et al. | 528/73 |
| 3,836,491 | 9/1974 | Taft et al. | 528/53 |
| 4,031,068 | 6/1977 | Cantor | 525/351 |
| 4,130,549 | 12/1978 | Ueno et al. | 528/93 |
| 4,331,782 | 5/1982 | Linden | 525/173 |
| 4,343,839 | 8/1982 | Blegan | 427/340 |
| 4,365,039 | 12/1982 | Blegan | 524/773 |
| 4,374,167 | 2/1983 | Blegan | 428/141 |
| 4,374,181 | 2/1983 | Blegen | 428/423.3 |
| 4,877,838 | 10/1989 | Toman | 525/107 |
| 4,888,441 | 12/1989 | Calbo, Jr. et al. | 560/198 |
| 4,922,002 | 5/1990 | Calbo, Jr. et al. | 528/286 |
| 5,019,100 | 5/1991 | Hennink et al. | 623/6 |
| 5,166,289 | 11/1992 | Yezrielev et al. | 525/443 |
| 5,210,155 | 5/1993 | Yezrielev | 525/442 |
| 5,235,006 | 8/1993 | Jones et al. | 525/510 |
| 5,239,018 | 8/1993 | Yezrielev et al. | 525/418 |
| 5,322,884 | 6/1994 | Wellman et al. | 524/601 |
| 5,326,831 | 7/1994 | Yezrielev et al. | 525/437 |
| 5,334,652 | 8/1994 | Wellman et al. | 524/601 |
| 5,334,671 | 8/1994 | Yezrielev et al. | 525/443 |
| 5,453,469 | 9/1995 | Yezrielev et al. | 525/418 |
| 5,458,920 | 10/1995 | Yezrielev et al. | 427/385.5 |
| 5,641,854 | 6/1997 | Jones et al. | 528/128 |
| 5,681,906 | 10/1997 | Yezrielev et al. | 525/450 |

FOREIGN PATENT DOCUMENTS

| | | |
|---|---|---|
| 0419088 | 3/1991 | European Pat. Off. . |
| 2809768 | 9/1978 | Germany . |
| 05155840 | 6/1993 | Japan . |
| 1290848 | 9/1972 | United Kingdom . |
| 96/23016 | 8/1996 | WIPO . |
| 96/23034 | 8/1996 | WIPO . |
| 96/23035 | 8/1996 | WIPO . |

OTHER PUBLICATIONS

Swarup, et al., "Thermoset Coating Compositions Having Improved Hardness," Research Disclosure No. 374, pp. 446–457, (Jun. 1995), Kenneth Mason Publications, Ltd., Hampshire, England.

Stumpe et al., "Deactivation of Excited States in Polyurethanes by Energy Transfer to Salicylic Acid Derivatives and its Application to the Photo–stabilisation of Polyurethanes", Polymer Degradation and Stability 17 (1987) 103–115.

*Primary Examiner*—Rabon Sergent
*Attorney, Agent, or Firm*—Fitch, Even, Tabin & Flannery

[57] ABSTRACT

Clearcoat compositions using a phenolic ester compound are described. The phenolic ester compound is selected from the group consisting of a phenolic ester alcohol, a phenolic urethane, a phenolic blocked isocyanate, and mixtures thereof.

20 Claims, No Drawings

CLEARCOAT COMPOSITIONS CONTAINING PHENOLIC ESTER COMPOUNDS

BACKGROUND OF THE INVENTION

This application is a continuation in part application of Ser. No. 08/621,171 filed Mar. 21, 1996 allowed, which application is a continuation in part application of Ser. No. 08/424,205 filed Mar. 19, 1995, now U.S. Pat. No. 5,681,906. This application also is a continuation in part application of Ser. No. 08/621,177 filed Mar. 21, 1996, now U.S. Pat. No. 5,973,072 which application stems from provisional patent application Ser. No. 60/002,063 filed Aug. 9, 1995. Further, this application is a continuation in part application of Ser. No. 08/702,966 filed Aug. 26, 1996 abandoned.

FIELD OF THE INVENTION

The present invention relates to compositions and methods for the preparation of multi-layered paint coated articles, and in particular, multi-layered automotive paints.

It is well known and desired in the automobile industry to provide automobiles with finishes having a high gloss. It also has been well known that several pigmented coatings topped or finished with a transparent top coat provide such a glossy finish. In the context of this invention and the automobile industry, "transparent coating" means a clearcoating which does not contain pigmentation or contains only transparent pigments. The terms "clear over color" and "color plus clear" also have been used to describe the coatings to which the invention pertains.

The clear top coat should advantageously have several properties to make it an exceptional clearcoat. The clearcoat should exhibit elasticity, toughness, hardness, acid resistance, solvent resistance, weatherability, detergent resistance and gloss. The coating composition which provides the top coat should be capable of being readily applied, sag resistant and compatible with pigmented base coats. In this connection, the clearcoat coating composition should be capable of being overpainted on a pigmented base coat after some volatiles have been removed from the base coat by a short "flashoff" or "predrying" in a "wet on wet" process with the resulting multilayered coating then being cured, such as by baking. The clearcoat coating composition should overcoat the pigmented base coat without redissolving or deleteriously affecting the base coat after a very short "predrying" time.

Finally, the clearcoat coating polymer composition should exhibit low viscosities so that it may be a high solids coating composition that contains less than about 45 weight percent volatile organic compounds (VOCs). The clearcoating composition should not only provide a low viscosity, but be capable of being applied with existing application equipment with little or no sagging.

OBJECTS OF THE INVENTION

It is an object of the invention to provide a clear coatcoating composition.

It is another object of the invention to provide a clearcoat coating composition which imparts elasticity, toughness, hardness, acid resistance, detergent resistance, solvent resistance, weatherability and gloss to a cured clearcoat.

It is yet another object of the invention to provide a clearcoat coating composition which has a low viscosity, is low in VOCs and which may be applied without sagging.

These and other objects of the invention will become apparent by reference to the following description.

SUMMARY OF THE INVENTION

The present invention is directed to a clearcoat coating composition and a polymeric vehicle which is effective for providing a clearcoat coating composition. The polymeric vehicle comprises a hydroxyl functional phenolic ester compound, a polyol, and a crosslinker which includes an amino resin. The polymeric vehicle must include a source of carbamate linkages for the cured coating binder. The coating binder should have at least about 0.7 weight percent carbamate linkages based upon the weight of the polymeric vehicle before crosslinking. The source of carbamate linkages may be 1) curing the polymeric vehicle with an isocyanate compound as a part of a crosslinker blend of amino resin and isocyanate compound and/or 2) the source of carbamate linkages may be carbamate derivatives of the phenolic ester alcohol described below.

The hydroxyl functional phenolic ester compound is selected form the group consisting of (i) a phenolic ester alcohol, (ii) a phenolic urethane having at least one free phenolic hydroxyl, (iii) a phenolic blocked isocyanate having at least one free aliphatic hydroxyl, (iv) phenolic blocked isocyanates and (v) mixtures thereof. In an important aspect, the phenolic ester alcohol has the general structural formula,

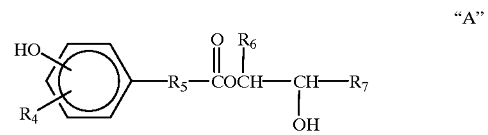

the phenolic urethane has the general structural formula,

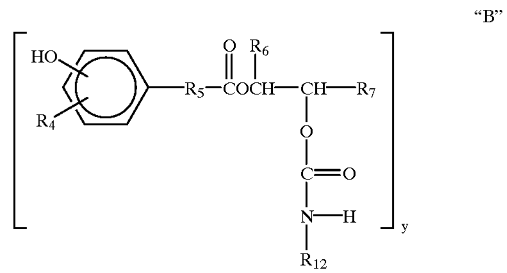

the phenolic blocked isocyanate has the general structural formula,

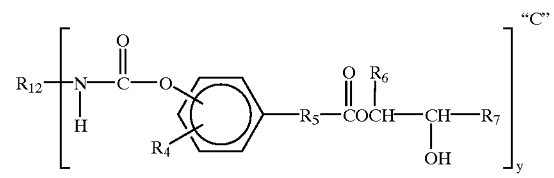

phenolic blocked isocyanates have the general formula,

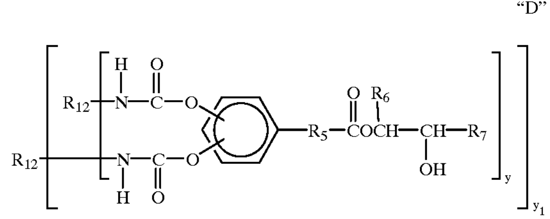

wherein $R_4$ is selected from the group consisting of hydrogen, halogen, hydroxyl, $C_1$ to $C_8$ alkyl and $C_1$ to $C_8$ alkoxy, $R_5$ is a direct bond or a $C_1$ to $C_{20}$ organic radical which may incorporate another phenol, aliphatic hydroxyl, ester, ether and/or carbonate group in its structure, $R_6$ is hydrogen or a $C_1$ to $C_{20}$ organic radical which may include an ester group, or a direct bond which may form with $R_7$ part of a 5 or 6 carbon atom cyclic ring structure, $R_7$ is $CH_2R_8$ wherein $R_8$ is selected from the group consisting of $OR_9$, $OOCR_{10}$ and $R_{11}$ wherein $R_9$ is a primary or secondary aliphatic group containing 3 to 20 carbon atoms which may include one or more ester linkages or an aromatic group containing 6 to 20 carbon atoms, $R_{10}$ is a primary, secondary or tertiary aliphatic group containing 4 to 20 carbon atoms which may include one or more ester linkages or an aromatic group containing 6 to 20 carbon atoms, and $R_{11}$ is a $C_2$ to $C_{20}$ organic radical which may include one or more ester linkages and where the organic radical may form with $R_6$ part of a 5 or 6 carbon atom cyclic ring structure, y is 1 through 20, $y_1$=1 through 4 and where $R_{12}$ is an alkyl, alkenyl, aromatic or alkyl, alkenyl and aromatic difunctional radical. In an important aspect y ranges from 2 through 3. In respect to the phenol blocked isocyanate, formula C is an important aspect of the invention. As used herein, a $C_1$ to $C_{20}$ alkyl means an alkyl group having one to twenty carbons.

The polymeric vehicle of the invention is crosslinked by an amino resin and a source of carbamate linkages in the cured coating binder. The source of the carbamate linkages may include an isocyanate compound, the hydroxyl functional phenolic ester compound in the form of formulas B, C and D and mixtures thereof. When the hydroxyl functional phenolic ester compound is the compound of formula A, the crosslinker is a blend which includes at least one amino resin and at least one isocyanate compound. The isocyanate compound is or provides a compound which has an isocyanate functionality which functionality is reactive with the polyol and phenolic ester compound to form carbamate linkages in the cured coating binder. The polymeric vehicle should be effective for providing a cured coating binder having from about 0.7 to 20 weight percent carbamate linkages based upon the weight of the polymeric vehicle before crosslinking. In an important aspect, the amino resin is a methylol (alkoxymethyl) amino resin. These types of resins generally are made by the reaction of di(poly) amide (amine) compounds with formaldehyde, and optionally, a lower alcohol. The isocyanate compound in the crosslinker blend has at least a difunctionality which is reactive with the polyol and the hydroxyl functionality of the phenolic ester compound. The isocyanate compound in the blend may be an isocyanate, biuret, uretdione, isocyanurate or blends thereof. The amino resin has an average crosslinking functionality of from about 3 to about 30 crosslinking groups per molecule, and in an important aspect, from about 4 to about 12 crosslinking groups per molecule. The isocyanate compound which is in the crosslinker blend has an average crosslinking functionality of from about 1.9 to about 20 isocyanate groups per molecule, and in an important aspect, from about 1.9 to about 4 crosslinking groups per molecule.

The polyols in the polymeric vehicle include acrylic polymer polyols, polyester polyols, and alkyd polymers. The alkyd polyols are derived from synthetic and naturally occurring fatty acids where not less than about 80 weight percent of the acids are saturated. The polyols have a number average molecular weight ($M_n$) of at least about 200, and in an important aspect, the $M_n$ is in the range of from about 300 to about 5,000, but not more than about 20,000. In an important aspect, the polyols are acrylic and polyester polymers.

The blend of amino resin and isocyanate compound crosslinkers is uniquely reactive with the hydroxyl functional phenolic ester compound and polyol. In an important aspect, where the source of carbamate linkages includes a phenolic ester compound having structural formulas B, C and D, the polymeric vehicle may also includes a polyfunctional isocyanate compound which is reactive with the hydroxyl of the polyol and phenolic ester compound, if any, of the latter compound in the polymeric vehicle. The carbamate linkages formed by the isocyanate reacting with hydroxyl (as well as carbamate linkages from formulas B, C and D) impart elasticity and adhesion properties to a film resulting from the application of the coating composition of the invention. During curing of the polymeric vehicle, the rate of reaction between the isocyanate compound and hydroxyl is fast and reduces sagging. The reaction of the amino resin crosslinker with the phenolic ring of the phenolic ester compound is slower than the isocyanate/hydroxyl reaction, but is believed to provide benzoxazine linkages which impart hardness, weatherability and detergent resistance. Illustrative of this aspect of the invention, a melamine formaldehyde resin reacts with the phenolic end of the phenolic ester compound to form a benzoxazine linkage such as the one illustrated below

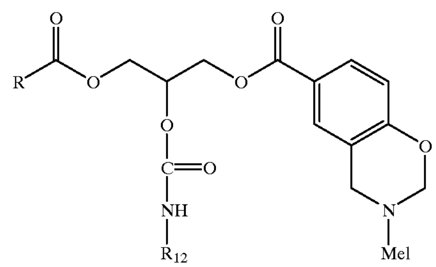

where "Mel" represents the melamine formaldehyde resin residue after reaction with the phenolic ring of the phenolic ester compound. This structure provides a very strong crosslink bond linkage because two bonds must be broken to break each crosslink. As shown above, the isocyanate reacts with the aliphatic hydroxyl.

According to the invention, the polymeric vehicle comprises a polyol, phenolic ester compound and source of carbamate linkages in amounts effective for providing a coating binder with a Tukon hardness of at least about 5 knoops. Further, the viscosity of the polymeric vehicle, which includes the polyol, phenolic ester compound, and additional carbamate source (if required) and optionally solvent, is in the range of from about 0.5 mPa.s to about 15 mPa.s at about 20° C. to about 60° C. at a shear of about 1,000 $sec.^{-1}$.

DESCRIPTION OF THE PREFERRED EMBODIMENTS

"Polyester" means a polymer which has —C(=O)O— linkages in the main chain of the polymer.

"Polyisocyanate" can mean compounds with two or more isocyanate groups [—N=C=O] which is "isocyanate functionality" which compounds may be biurets, uretdiones and isocyanurates.

"Biuret" means an isocyanate reacted with water in a ratio of three equivalents of isocyanate to one mole of water, such as the biuret of HDI shown below:

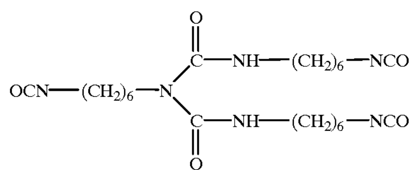

An "isocyanurate" is a six-membered ring having nitrogens at the 1, 3 and 5 positions and keto groups at the 2, 4 and 6 positions, the nitrogens being substituted with an isocyanate group, such as shown below in the isocyanurate of HDI.

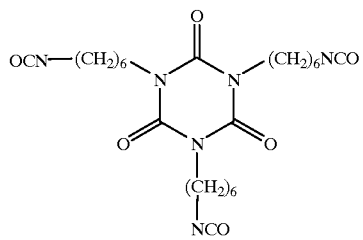

"Phenolic blocked isocyanate having reactive aliphatic hydroxyl groups" means a compound which has isocyanate functionality, such as an isocyanate, uretdione, isocyanurate or biuret, which isocyanate functionality is blocked with a phenolic blocking group having at least one aliphatic hydroxyl group, where the isocyanate group is blocked with the phenolic blocking group through a phenolic oxygen on the aromatic phenyl ring of phenolic blocking and where the aliphatic hydroxyl group is free and unreacted.

"Phenolic blocking group" is the group which blocks the isocyanate through the oxygen on the phenyl ring of the phenolic alcohol as described herein. The phenolic blocking group has an aliphatic hydroxyl group which is free and unreacted and the structure of the phenolic alcohol as described herein, with the hydrogen on the phenol hydroxyl group being removed to provide a "phenolic oxygen." By way of example, the phenolic blocking group has the structure as shown below

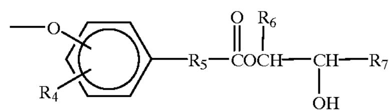

"Crosslinking agent" means a polyfunctional compound capable of reaction with a hydroxyl of a polyol or a phenol hydroxyl or both. These agents include a compound having di- or polyfunctional isocyanate groups or a polyfunctional amino resin or an aliphatic polyfunctional epoxy resin. An aliphatic epoxy resin does not have an aromatic ring bonded to an oxygen. The isocyanate compound or amino resin, which may contain isocyanate or other crosslinking functional groups that are capable of forming covalent bonds with the hydroxyl groups on the polyol, are present in the polymeric vehicle. In an important aspect of the invention, the crosslinking agent is a blend of at least one amino resin and at least one isocyanate compound; hence, there may be more than one amino resin and/or isocyanate compound which forms the blend of compounds which form covalent bonds with the hydroxyl groups of the polyol. Amino reins and polyisocyanates are such crosslinking agents.

"Isocyanate compound" means a compound which when reacted with an hydroxyl results in a carbamate linkage. As used in this application, the isocyanate compound is a compound other than a compound having formulas B, C and D. The isocyanate compound may be a polyisocyanate (blocked and unblocked), a biuret (blocked and unblocked), an uretdione (blocked and unblocked) and an isocyanurate (blocked and unblocked).

"Carbamate linkage" means —OC(=O)N(—H)— which can be a urethane linkage.

"Polymeric vehicle" means polymeric and resinous components in the formulated coating composition, i.e., before film formation, including but not limited to the polyol and phenolic ester compound.

"Coating binder" means the polymeric part of the film of the coating after solvent has evaporated and after crosslinking.

"Formulated coating" composition means the polymeric vehicle and optional solvents, as well as pigments, catalysts and additives which may optionally be added to impart desirable application characteristics to the formulated coating and desirable properties, such as clearity, elasticity, hardness and weatherability to the film.

"VOC" means volatile organic compounds.

"Diol" is a compound, oligomer or polymer with two hydroxyl groups. "Polyol" is a compound, oligomer or polymer with two or more hydroxyl groups.

"Solvent" means an organic solvent.

"Organic solvent" means a liquid which includes but is not limited to carbon and hydrogen and has a boiling point in the range of from about 30° C. to about 300° C. at about one atmosphere pressure.

"Volatile organic compounds" are defined by the U.S. Environmental Protection Agency at 40 C.F.R. 51.000 of the Federal Regulations of the United States of America as any compound of carbon, excluding carbon monoxide, carbon dioxide, carbonic acid, metallic carbides or carbonates, and ammonium carbonate, which participates in atmospheric photochemical reactions. This includes any such organic compound other than the following, which have been determined to have negligible photochemical reactivity: acetone; methane; ethane; methylene chloride (dichloromethane); 1,1,1-trichloroethane (methyl chloroform); 1,1,1-trichloro-2,2,2-trifluoroethane (CFC-113); trichlorofluoromethane (CFC-11); dichlorodifluoromethane (CFC-12); chlorodifluoromethane (CFC-22); trifluoromethane (FC-23); 1,2-dichloro-1,1,2,2-tetrafluoroethane (CFC-114); chloropentafluoroethane (CFC-115); 1,1,1-trifluoro 2,2-dichloroethane (HCFC-123); 1,1,1,2-tetrafluoroethane (HF-134a); 1,1-dichloro 1-fluoroethane (HCFC-141b); 1-chloro 1,1-difluoroethane (HCFC-142b); 2-chloro-1,1,1,2-tetrafluoroethane (HCFC-124); pentafluoroethane (HFC-125); 1,1,2,2-tetrafluoroethane (HFC-134); 1,1,1-trifluoroethane (HFC-143a); 1,1-difluoroethane (HFC-152a); and perfluorocarbon compounds which fall into these classes:

(i) Cyclic, branched, or linear, completely fluorinated alkanes;

(ii) Cyclic, branched, or linear, completely fluorinated ethers with no unsaturations;

(iii) Cyclic, branched, or linear, completely fluorinated tertiary amines with no unsaturations; and (iv) Sulfur containing perfluorocarbons with no unsaturations and with sulfur bonds only to carbon and fluorine. Water is not a VOC.

A "film" is formed by application of the formulated coating composition to a base or substrate, evaporation of solvent, if present, and crosslinking.

The Phenolic Ester Alcohol

The phenolic ester alcohol has at least one phenolic hydroxyl group, and at least one aliphatic hydroxyl group. In an important aspect, it has two ester groups and about one aliphatic hydroxyl group. Generally, it is the reaction product of a phenol carboxylic acid and an epoxy compound. In an important aspect, the phenolic ester alcohol is represented by the general formula "A"

"A"

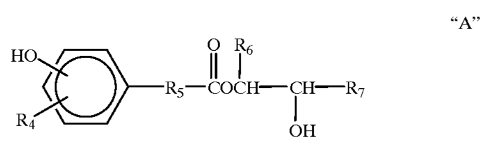

wherein $R_4$ through $R_{11}$ is set forth above. The phenolic ester alcohol has a molecular weight of not greater than about 1,500 and is in the range of from about 248 to about 1,500. In a particularly important aspect $R_5$ is a direct bond and $R_7$ has an ester group. The —OH expressly shown in formula A is illustrative of an aliphatic hydroxyl group. In an important aspect, the hydroxyl group on the phenolic benzene ring is in the para position to $R_5$, and $R_4$ is H. As used herein, an ester group means

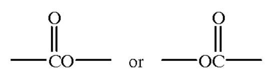

A phenolic ester alcohol which is particularly important to the invention is represented by general formula E.

"E"

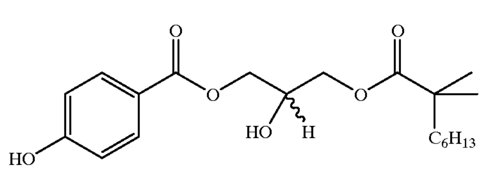

A phenol carboxylic acid reactant which may be reacted with the epoxy compound has the general formula:

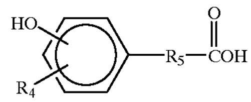

wherein $R_4$ and $R_5$ are as described above. Examples of suitable phenol carboxylic acids include hydroxybenzoic acids, acids where $R_5$ is alkylene such as phenyl acetic acid, hydroxy phenyl propionic acid, hydroxyphenyl stearic acid, and acids where in $R_5$ encompasses additional phenol functionality such as 4,4-bis hydroxyphenyl pentanoic acid and the like. In a preferred embodiment of the invention, $R_4$ in formula A is hydrogen, $R_5$ is a direct bond, $R_6$ is hydrogen and $R_7$ is $CH_2OH$, a hydrocarbon moiety or an organic moiety containing ester or ether groups and containing from 1 to about 20 carbon atoms, more preferably from about 3 to 20 carbon atoms.

In an important aspect of the invention, the phenolic ester alcohol is the ester reaction product of para hydroxybenzoic acid and an epoxy compound, such as the monoglycidyl compound with the formula ("F")

"F"

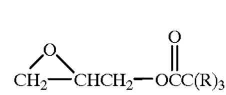

where R represents a mixture of aliphatic groups, most preferably the three R groups in the glycidyl compound having a total of 8 carbon atoms. Such a glycidyl compound is commercially available from Exxon Chemical Company under the trademark Glydexx®. Other suitable hydroxybenzoic acids include ortho-hydroxybenzoic acid (salicylic acid) and meta-hydroxybenzoic acid.

The epoxy compound may be selected from the group consisting of glycidyl esters, glycidyl alcohols, glycidyl ethers and linear epoxies. These include glycidol, glycidyl ethers of the structure:

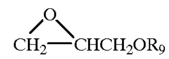

glycidyl esters of the structure:

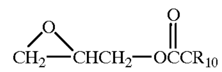

glycidyl or oxirane compounds having the structure:

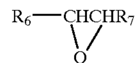

and cycloaliphatic epoxy compounds having the structures:

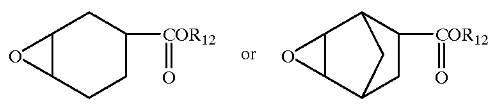

wherein $R_{12}$ is an organic radical having 1–12 carbon atoms which can include ether, ester, hydroxyl or epoxy groups.

Other epoxy materials include epoxidized alpha-olefins.

Suitable epoxy compounds particularly include monoepoxides containing a terminal glycidyl group or polyepoxides containing internal oxirane or glycidyl groups or terminal glycidyl groups. Suitable epoxy compounds include glycidyl acrylate or methacrylate monomers, alkyl glycidyl ether monomers, and low molecular weight copolymers of one or more of these monomers with one or more ethylenically unsaturated monomers such as acrylates, methacrylates, vinyl aromatic monomers and the like.

Other suitable epoxy compounds include the ester reaction products of epichlorohydrin with mono- or dibasic aliphatic or aromatic carboxylic acids or anhydrides containing from about 1 to 20 carbon atoms. Inclusive of such acids are aliphatic acids such as acetic, butyric, isobutyric, lauric, stearic, maleic and myristic acids and aromatic acids such as benzoic, phthalic, isophthalic and terephthalic acids as well as the corresponding anhydrides of such acids. Preferred such acids are primary, secondary or tertiary aliphatic carboxylic acids containing from 5 to 13 carbon atoms. As described above, a very important aspect of the invention is when the epoxy compound is the glycidyl ester of a mixed aliphatic, mostly tertiary, mono carboxylic acid with an average of 9 to 11 carbon atoms such glycidyl ester being available from Exxon Chemical Co., under the trade name GLYDEXX® or from Shell Chemical Co., under the trade name CARDURA® E ester. These may be represented by the general formula "F". (Glydexx® general formula).

Still other epoxy compounds include glycidyl ether reaction products of epichlorohydrin with aliphatic or aromatic alcohols or polyols containing from about 1 to 20 carbon atoms. Suitable alcohols include aliphatic alcohols such as ethanol, isopropanol, isobutyl alcohol, hexanol, stearyl alcohol and the like; and aliphatic polyols such as ethylene glycol, propylene glycol and butylene glycol.

Other epoxy compounds which may be used include the mono-epoxides of $C_8$ to $C_{20}$ alpha mono-olefins.

In a very important aspect of making the phenolic ester alcohol, the hydroxybenzoic acid/epoxy reaction product may be formed by reacting the hydroxybenzoic acid and the epoxy compound to provide a phenolic ester alcohol with one aliphatic hydroxyl group, optionally in a solvent therefor, at a temperature ranging from about 90° to about 120° C. to initiate such reaction. Once the reaction starts by heating, it is exothermic, and the reaction temperature can rise to a temperature of about 150° to 175° C. usually without application of external heat. The reaction temperature then is maintained at about 150° C. to 170° C. (and preferably less than about 200° C.) until the reaction has been determined to be substantially complete.

Reaction products of reduced discoloration can be produced by control of the maximum temperature of the exothermic reaction. This can be achieved by a staged and/or incremental addition of one of the reactants, e.g. the epoxy reactant, so that the reaction temperature is maintained at a temperature of about 150° C. or below. The remainder of that reactant may then be added in stages or continuously while maintaining the reaction temperature below about 150° C. This process modification gives rise to reaction products having lower Color Index values.

Approximately stoichiometric quantities of the epoxy compound and the phenol carboxylic acid are used in the reaction, although a slight molar excess of epoxy may be necessary to drive the reaction to completion.

The Phenolic Urethane Reactive Diluent

In one aspect, the phenolic urethane reactive diluent may be described as the reaction product of the above-described phenolic ester alcohol having at least one aliphatic hydroxyl group and a compound having an average isocyanate functionality of from about 1 to about 20. The ratio of an isocyanate to phenolic ester alcohol in the reaction mixture is about 1 equivalent isocyanate group per equivalent of aliphatic hydroxyl in the phenolic ester alcohol. The isocyanate reacts with the aliphatic hydroxyl of the phenolic ester alcohol. The reaction is catalyzed by soluble tin salts such as dibutyl tin dilaurate and dibutyl tin diacetate and divalent zinc salts such as zinc diacetate. In an important aspect, the isocyanate compound has an average isocyanate functionality of from about 1.9 to about 3.

In an important aspect, the phenolic urethane reactive diluent has the following general formula where $R_1$ through $R_{11}$ are defined above and $R_{12}$ is defined as set forth above and below:

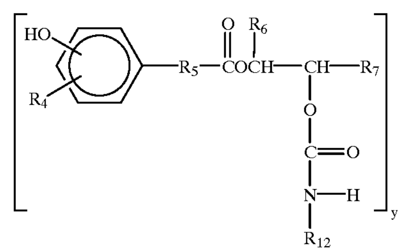

In the above formula, y is 1 to 20. In an important aspect y is 2 or 3. $R_{12}$ is an alkyl, alkenyl, aromatic or alkyl, alkenyl and aromatic difunctional radical. The difunctional radical can include or be

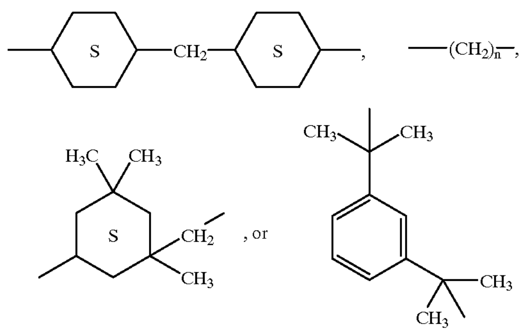

and where n=more than 1 and preferably 6. In an important aspect of the invention, the $R_{12}$ radical is

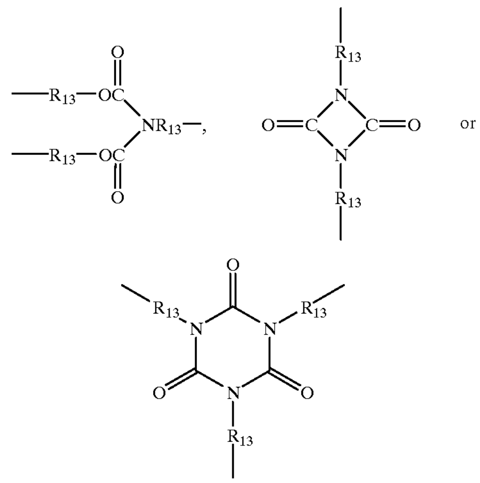

where $R_{13}$ is a difunctional radical as described above in connection with $R_{12}$. In yet another important aspect, the phenolic OH is in the para position relative to $R_5$ and $R_4$ is H. The molecular weight of the phenolic urethane is not greater than about 50,000, and in an important aspect, a molecular weight of not greater than about 2,000.

The phenolic ester alcohol is the reaction product of a phenol carboxylic acid and an epoxy compound as described above.

The Phenol Blocked Isocyanate

The phenol blocked isocyanate, as does the phenolic ester alcohol and phenolic urethane reactive diluent, serves as a hardener for the polymeric vehicle to which it is added. The phenol blocked isocyanate may serve as a hardener in at least two ways: (1) multifunctional isocyanate becomes available after unblocking from the phenolic blocking group which becomes a phenolic alcohol; and (2) after unblocking, the phenolic alcohol serves as a multifunctional hardener which is reactive with other components of the polymeric vehicle. Further, incorporating the phenol blocking group into the coating binder mitigates the problem of having a toxic phenol blocking agent released upon the curing of the coating.

In one aspect, the phenol blocked isocyanate having reactive aliphatic hydroxyl groups may be described as the reaction product of the above-described phenolic ester alcohol having at least one aliphatic hydroxyl group and a compound having an average isocyanate functionality of from about 1 to about 20, and in an important aspect, the average isocyanate functionality is 1.9 through 3. The ratio of isocyanate functionality to phenolic ester alcohol in the reaction mixture is in the range of about 1 equivalent of isocyanate group per equivalent of phenolic hydroxyl of the phenolic ester alcohol. The unblocked isocyanate reacts with the phenolic hydroxyl. This provides an urethane linkage at each phenolic oxygen on the phenolic blocking group, leaving the aliphatic hydroxyl group on the phenolic blocking group free and unreacted. The blocked isocyanate of the invention is not polymeric because the phenolic oxygen forms part of an urethane linkage, but the aliphatic hydroxyl group is unreacted. Prior to curing the polymeric vehicle, both ends of the phenolic blocking group of the blocked isocyanate of the invention are not bound as part of urethane linkages which form a two or three dimensional polymeric matrix.

In an important aspect, there is only one urethane linkage at one phenolic oxygen which oxygen is associated one phenolic blocking group. In this aspect, two or more blocking groups block two or more isocyanate groups on the same isocyanate compound, such as when y=2 or 3 in formula C. In an important aspect, the reaction to make the blocked isocyanate is catalyzed by a tertiary amine, which in an important aspect, is 1,4-diazabicyclo[2.2.2]octane (DABCO), but also may be catalyzed with tertiary phosphines and carbonates.

As described above, the phenol blocked isocyanate of the invention has the general formulas C and D. The phenol blocked isocyanate in this aspect of the invention has reactive aliphatic hydroxyl groups, and, in an important aspect, may be represented by the following general formula where the $R_1$ through $R_{12}$ and y and $y_1$ is set forth above and below.

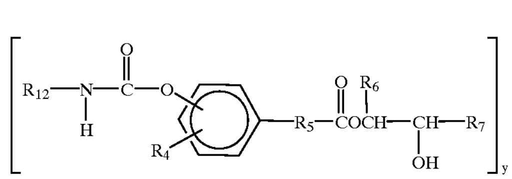

In an important aspect in respect to Formula C, y=2 and 3, the $R_{12}$—NHCOO group is para to $R_5$ and $R_4$ is H. The molecular weight of the phenol blocked isocyanate is not greater than 50,000, and in an important aspect, not greater than 2,000.

The phenolic ester alcohol used to make the phenol blocked isocyanate is the reaction product of a phenol carboxylic acid and an epoxy compound as described above.

The phenol blocked isocyanate of the invention may be thermally unblocked to give free isocyanate or it may be rearranged such that the isocyanate may be unblocked from the phenyl ring of the phenolic alcohol and reattached to a aliphatic hydroxyl of the phenolic alcohol in what is called a transcarbonolyation reaction. The speed of this reaction is enhanced by use of a catalyst such as a tin catalyst which is a soluble tin salt such as dibutyl tin dilaurate and dibutyl tin acetate and divalent zinc salts such as zinc diacetate.

An example of a rearrangement is the rearrangement of compound 1 to the structure of the compound 3 below

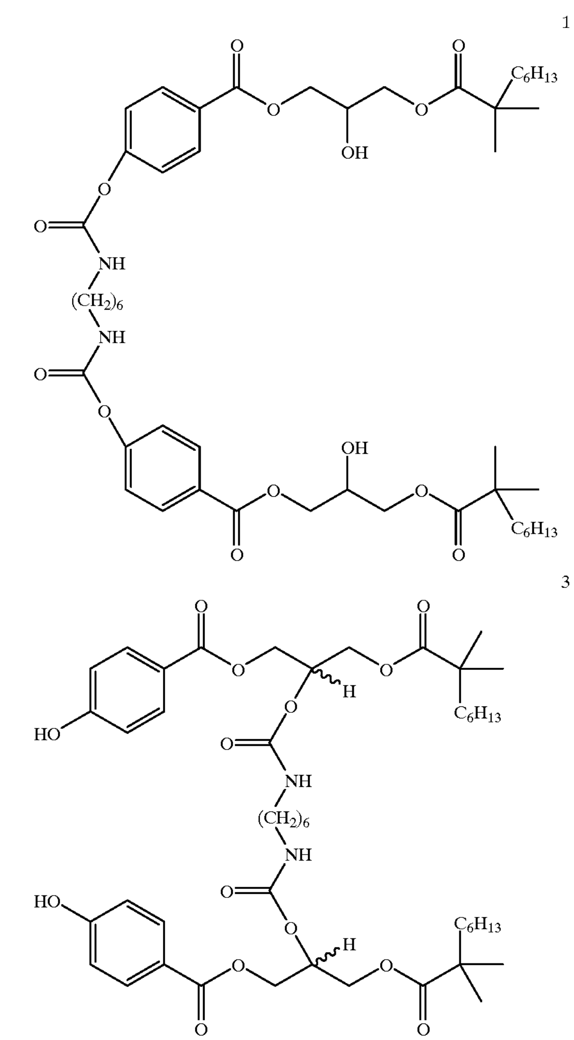

The Isocyanates used to make the Phenolic Urethane and Phenolic Blocked Isocyanates.

The phenolic urethane and the phenol blocked isocyanate of the invention may be made with low molecular weight monoisocyanates and polyisocyanates, but in important aspects, they are made with compounds having di and triisocyanate functionality. These polyisocyanates may have molecular weights up to about 20,000. Unblocked di- or polyisocyanates, unblocked biurets and unblocked isocyanurates all may be reacted with the phenolic hydroxyls and/or the aliphatic hydroxyls of the phenolic ester to form carbamate linkages [—OC(=O)N(—H)—]. The resulting urethane and/or blocked isocyanate at low molecular weights serves as a hardener to harden the coating binder. An example of such a phenol blocked isocyanate is 2-hydroxyethyl salicylate blocking HDI.

Diisocyanates which may be used in the invention include hexamethylene diisocyanate (HDI), isophorone diisocyanate (IPDI), tetramethylxylene diisocyanate (TMXDI), and other aliphatic diisocyanates such as trimethylene diisocyanate, tetramethylene diisocyanate, pentamethylene diisocyanate, 1,2-propylene diisocyanate, 2,3-butylene diisocyanate, 1,3,-butylene diisocyanate, 2,4,4- or 2,2,4-trimethylhexamethylene diisocyanate; cycloalkylene diisocyanates such as 1,3-cyclopentane-diisocyanate, 1,4-cyclohexane-diisocyanate and 1,3-cyclohexane-diisocyanate; and aromatic diisocyanates such as m-phenylene diisocyanate, p-phenylene diisocyanate, 4,4'-diphenyldiisocyanate, 1,5-naphthalene diisocyanate, 4,4'-diphenylmethane diisocyanate, 2,4- or 2,6-toluene diisocyanate.

The polyisocyanates which may be used may be dimerized, such as uretdiones or trimerized diisocyanates such as trimerized HDI or IPDI and triisocyanates such as triphenylmethane-4,4',4"-triisocyanate, 1,3,5-triisocyanatobenzene, 1,3,5-triisocyanatocyclohexane, 2,4,6-triisocyanatetoluene and ω-isocyanatoethyl-2,6-diisocyanatocaproate; and tetraisocyanates, such as 4,4'-diphenyldimethylmethane-2,2',5,5'-tetraisocyanate.

The isocyanates also may be polymers or copolymers with vinyl monomers of isocyanate functional monomers such as

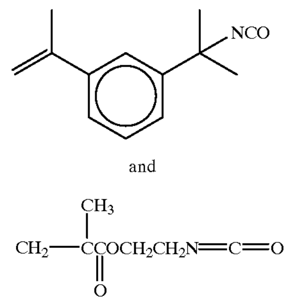

and

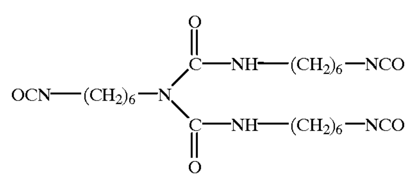

In another aspect of the invention, unblocked biurets such as the biuret of hexamethylene diisocyanate (HDI) which biuret has the structure $$OCN—(CH_2)_6—N(—C(=O)—NH—(CH_2)_6—NCO)_2$$

and is a trimerized product of hexamethylene diisocyanate and water may be used in lieu of polyisocyanates.

In a particularly important aspect of the invention, an isocyanate, biuret, isocyanurate or blends thereof with an —N=C=O functionality of about 2 or 3 provides a particularly useful urethane and phenol blocked isocyanates when reacted with a phenolic ester alcohol which is a reaction product of a hydroxybenzoic acid such as PHBA and glycidyl ester of a mixed aliphatic such as Glydexx®.

In the phenolic urethane aspect of the invention, the product of HDI and the compound of formula "E" provides a particularly useful urethane which is shown below.

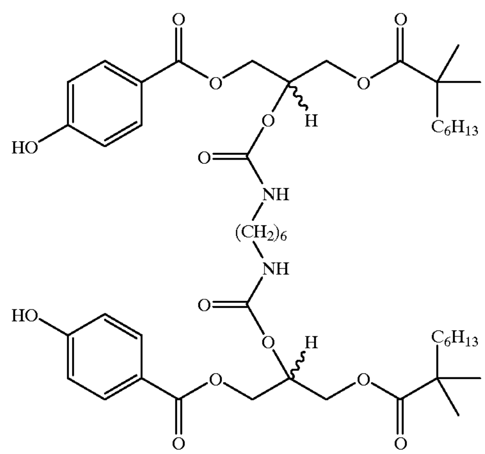

Also in the phenolic urethane aspect of the invention, the product of the isocyanurate of HDI and the compound of formula E provides a particularly useful urethane show below.

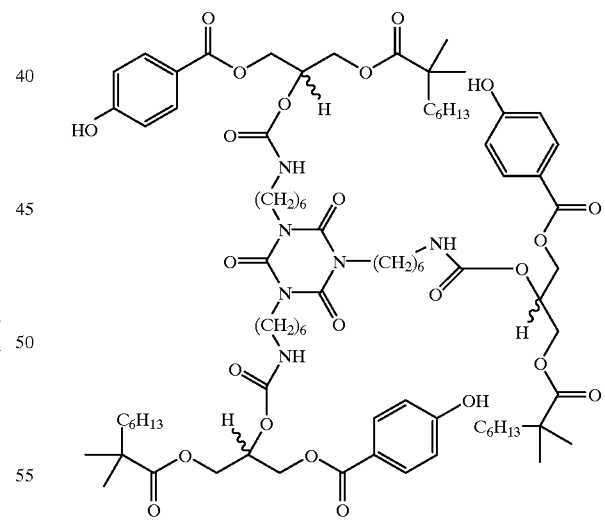

In the blocked isocyanate aspect of the invention, the product of HDI and the phenolic ester alcohol of formula E in an amine catalyzed reaction provides the very useful blocked isocyanate shown below.

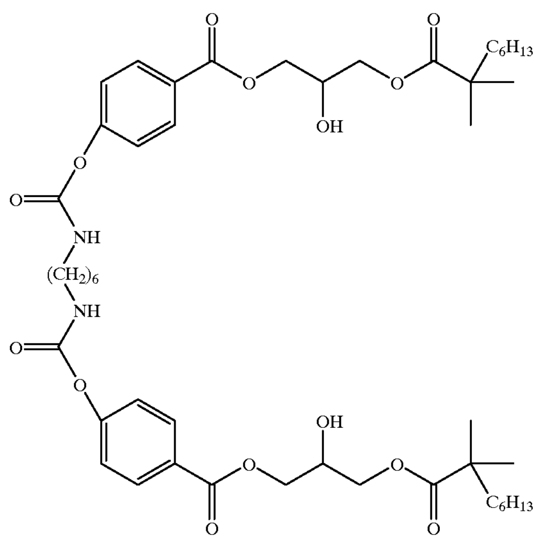

Also in the blocked isocyanate aspect of the invention, the product of the isocyanurate of HDI and the compound of formula E provides the very useful blocked isocyanate shown below.

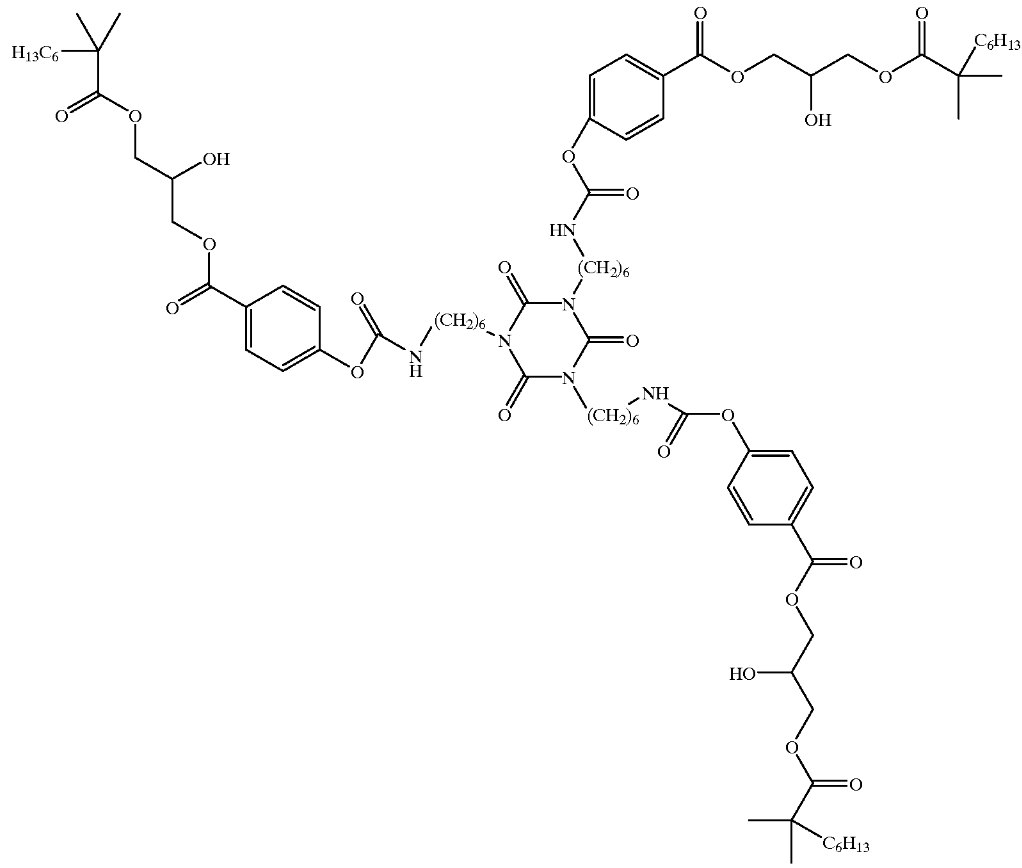

The Crosslinking Agent

When the phenolic ester compound is the phenolic ester alcohol, the crosslinking agent used in the invention is a blend of at least one amino resin and at least one isocyanate compound. The isocyanate compound serves as the source of carbamate linkages in the coating binder. Both the amino resin and isocyanate compound should be at least difunctional. The isocyanate compounds in the crosslinker blend are the same isocyanates which can be used to make the phenolic urethane and phenolic blocked isocyanates except for monoisocyanates which can be used to make the urethane and blocked phenolic isocyanates. The isocyanate compound crosslinkers can be unblocked or blocked polyisocyanates, one or more unblocked or blocked biurets, and one or more blocked or unblocked isocyanurates or uretdiones.

When the phenolic ester compound is the phenolic urethane and/or the phenolic blocked isocyanate (formulas B, C and D), the phenolic ester compound may serve as a source of carbamate linkages in the coating binder which results upon curing the polymeric vehicle. In an important aspect, however, even when the polymeric vehicle includes phenolic urethane and/or phenolic blocked isocyanate, the crosslinker also will include isocyanate compound.

The source of carbamate linkages should be present in an amount effective for providing the cured coating binder with from about 0.7 to about 20 weight percent carbamate linkages based upon the weight of the polymeric vehicle before crosslinking. Effective amounts of phenolic ester, polyol and crosslinker for permitting the polymeric vehicle to crosslink into a coating binder with a Tukon hardness of at least about 5 knoops at a film thickness of from about 1 to 3 mils, and generally about 2 mils, as described above are used. In an important aspect, the source of carbamate linkages are present in an amount effective for providing the coating binder with from about 2 to about 16 weight percent carbamate linkages, based upon the weight of the polymeric vehicle.

The polymeric vehicle contains from about 0.3 to about 3.0 equivalents of isocyanate functionality per equivalent of aliphatic hydroxyl from any source, e.g., polyol and phenolic ester alcohol. In an important aspect, the polymeric vehicle contains from about 0.8 to about 1.8 equivalents of isocyanate per equivalent of aliphatic hydroxyl and preferably 1.0 to 1.2 equivalent of isocyanate per equivalent of aliphatic hydroxyl. More than 1 equivalent of an isocyanate per equivalent of an aliphatic hydroxyl compensates isocyanate functionaltiy which may be consumed in side reactions. When the phenolic ester compound has formulas B, C and D, the number of isocyanate equivalents of isocyanate in the polymeric vehicle from isocyanate compound can be zero, but preferably is not.

As will be seen below, the amino resin has >$NCH_2OR$ amino resin functionality where R=alkyl, H and —$CH_2N$<, where the alkyl has eight carbons or less. The polymeric vehicle has from about 1.9 to about 12 equivalents of amino resin functional groups per equivalents of phenolic hydroxyl. In an important aspect, the polymeric vehicle comprises from about 3 to about 5 equivalents of amino resin functional groups per equivalent of phenolic hydroxyl. Moreover, if there is residual or "left over" aliphatic hydroxyl available in the polymeric vehicle after the reaction of isocyanate functionality with aliphatic hydroxyl from any source, the polymeric vehicle comprises from about 0.8 to about 1.5, and preferably, about 1.0 to about 1.1 equivalent of amino resin functionality per equivalent of aliphatic hydroxyl.

When the polymeric vehicle includes a polyol and the phenol blocked isocyanate, the polymeric vehicle generally comprises at least about 20 weight percent polyol and generally from about 40 to about 65 weight percent polyol, from about 5 to about 40 weight percent phenol blocked isocyanate and from about 20 to about 50 weight percent crosslinker blend. When the polymeric vehicle includes polyol and phenolic urethane, the polymeric vehicle generally comprises at least about 20 weight percent polyol and generally from about 40 to about 65 weight percent polyol, from about 8 to about 50 weight percent phenolic urethane and from about 20 to about 50 weight percent crosslinker blend. When the polymeric vehicle includes phenolic ester alcohol, the polymeric vehicle generally comprises at least about 15 weight percent polyol and generally from about 30 to about 70 weight percent polyol, from about 5 to about 50 weight percent phenolic ester alcohol and from about 25 to about 50 weight percent crosslinker blend.

As noted above, except for monoisocyanates, the same polyisocyanates, biurets and isocyanurates may be used as crosslinkers that are used to make the phenol blocked isocyanate. If, however, a compound which is high in isocyanate functionality (numerous isocyanate groups) is used to make the phenol blocked isocyanate, then a compound which is lower in isocyanate functionality should be used as a crosslinker.

Blocking agents which block the isocyanate groups and "deblock" at elevated temperature are known and are used in the invention. These include oximes, lactams, imines, carbamates such as acetone oxime, methyl ethyl ketoxime, and ϵ-caprolactam.

Methylol (alkoxymethyl) amino crosslinking agents are suitable for use in the present invention and are well known commercial products, and are generally made by the reaction of di (poly) amide (amine) compounds with formaldehyde and, optionally, a lower alcohol. These are so-called MF resins.

The number of equivalents of amino resin as described above is the number of formaldehyde units reacted with nitrogen to provide =$NCH_2O$— in the resin. Hence, ($CH_3OCH_2$)N— has two equivalents.

MF resins are synthesized by formulating melamine using a base catalyst usually followed by alkoxylation with an acid catalyst. There are several types of MF resins depending on the degrees of formulation and the degrees of alkoxylation. A completely formulated MF resin will have six methylol groups substituted at the amino nitrogens of the melamine with the idealized structure 1. The important commercial MF resin known as hexakis(methoxymethyl) melamine or HMMM contains a high proportion of structure 2 with the methylol groups blocked by methyl groups. It has been reported that among the MF resins, the reactivity of the completely methylolated resins, such as 2 with diols, is greater than that of partially methylolated MF resins.

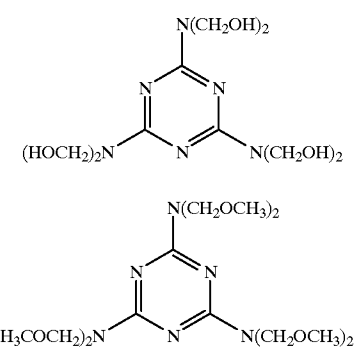

Structures 1 and 2 are only idealized structures. In reality, the resins contain dimeric, trimeric, and higher-order oligomeric structures. The reaction pathways leading to the oligomerization of these resins have been postulated in the literature. These oligomers may have methylene (>$NCH_2N$<) and/or methylene ether (>$NCH_2OCH_2N$<) linkages between the melamine groups. Idealized forms of the dimeric structures (3 and 4)of HMMM resins having these linkages are shown below:

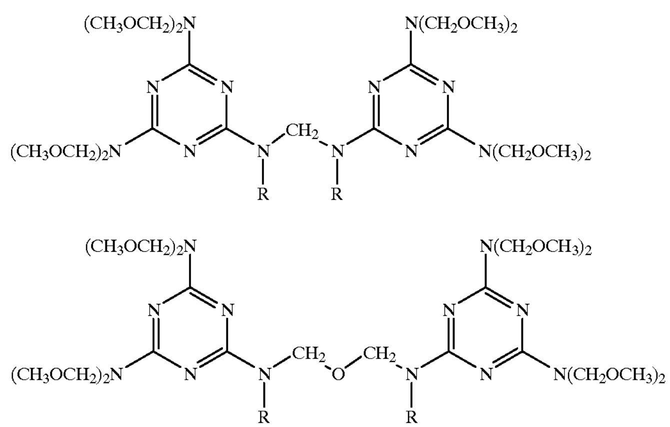

wherein R—$CH_2OCH_3$, H or —$CH_2OH$

Examples of suitable amino-crosslinking resins include one or a mixture of the following materials:

Melamine based resins

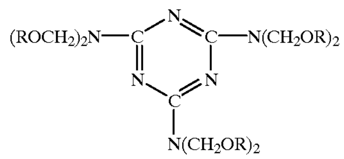

wherein R is the following:

R=$CH_3$ (Cymel)® 300, 301, 303);

R=$CH_3$, $C_2H_5$ (Cymel® 1116);

R=$CH_3$, $C_4H_9$ (Cymel® 1130, 1133);

R=$C_4H_9$ (Cymel® 1156); or

R=$CH_3$, H (Cymel® 370, 373, 380, 385).

R=$CH_2OH$

The preferred melamine is a hexamethoxymethyl melamine-type resin.

Benzoguanamine based resins

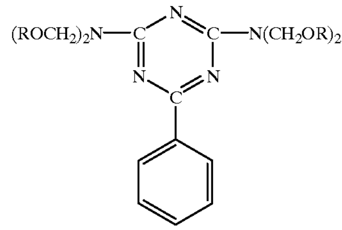

wherein R=$CH_3$, $C_2H_5$ (Cymel® 1123).

The Polyols In The Polymeric Vehicle

The polyols which are used in the invention are selected from the group consisting of acrylic polymers polyesters and alkyd polymers derived from synthetic and naturally occurring fatty acids where not less than about 80 weight percent of the acids are saturated. The polyols have an number average molecular weight ($M_n$) of at least about 200, preferably at least about 300, and may generally range from about 200 up to about 20,000.

The diesters and polyesters may be prepared by well known condensation processes using a molar excess of diol. Preferably the molar ratio of diol to dicarboxylic acid is p+1:p wherein p represents the number of moles of dicarboxylic acid. The reaction may be conducted in the absence of or presence of a suitable polycondensation catalyst as is known in the art.

Polyesters also can be made from carboxylic acids and oxiranes, such as

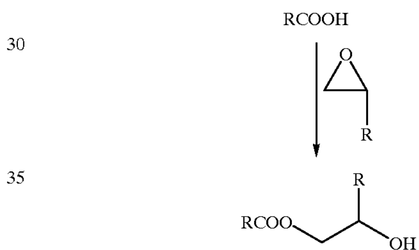

R=H, alkyl, aryl

Some preferred examples of the diols used to make the polyester polyols are one or more of the following: neopentyl glycol; ethylene glycol; hexamethylenediol; 1,2-cyclohexanedimethanol; 1,3-cyclohexanedimethanol; 1,4-cyclohexanedimethanol; diethylene glycol; triethylene glycol; tetraethylene glycol; dipropylene glycol; polypropylene glycol; hexylene glycol; 2-methyl-2-ethyl-1,3-propanediol; 2-ethyl-1,3-hexandediol; 1,5-pentanediol; thiodiglycol; 1,3-propanediol; 1,2-propanediol; 1,2-butanediol; 1,3-butanediol; 2,3-butanediol; 1,4-butanediol; 2,2,4-trimethyl-1,3-pentanediol; 1,2-cyclohexanediol; 1,3-cyclohexanediol; 1,4-cyclohexanediol; neopentyl diol hydroxy methyl isobutyrate, and mixtures thereof. Examples of polyols include triols such as glycerine, timethylol ethane, trimethylol propane, pentaerythritol and the like.

The diols are reacted with carboxyl groups to make the polyesters. The carboxyl groups may be present in the form of anhydride groups, lactone groups, or equivalent ester forming derivatives such as the acid halide or methyl ester. The dicarboxylic acids or derivatives are preferably one or more of the following: phthalic anhydride, terephthalic acid, isophthalic acid, naphthalene dicarboxylic acids, adipic acid, succinic acid, glutaric acid, fumaric acid, maleic acid, cyclohexane dicarboxylic acid, azeleic acid, sebasic acid, dimer acid, caprolactone, propiolactone, pyromellitic dianhydride, substituted maleic and fumaric acids such as citraconic, chloromaleic, mesaconic, and substituted succinic acids such as aconitic and itaconic, and mixtures thereof. Many commercially available polyesters are produced using a combination of aromatic and aliphatic dicarboxylic acids or a combination of cycloaliphatic and aliphatic dicarboxylic acids or combinations of all three types. However, where polyesters having low viscosity and low solvent content are desired, the most preferred acids used for the purposes of this invention are linear saturated or unsaturated aliphatic dicarboxylic acids having from 2 to 10 carbon atoms such as succinic, glutaric, adipic, and similar materials.

The acrylic polymers which may be used as the polyol component in the present invention are acrylic copolymer resins. The acrylic copolymer resin is prepared from at least one hydroxy-substituted alkyl (meth) acrylate and at least one non-hydroxy-substituted alkyl (meth) acrylate. The hydroxy-substituted alkyl (meth) acrylates which can be employed as monomers comprise members selected from the group consisting of the following esters of acrylic or methacrylic acid and aliphatic glycols: 2-hydroxyethyl acrylate, 3-chloro-2-hydroxypropyl acrylate; 1-hydroxy-2-acryloxy propane; 2-hydroxypropyl acrylate; 2,3-dihydroxypropylacrylate; 3-hydroxybutyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 1-hydroxy-2-methacryloxy propane; 2-hydroxypropyl methacrylate; 2,2-dihydroxypropyl methacrylate; 2-hydroxybutyl methacrylate; 3-hydroxybutyl methacrylate; 2-hydroxyethyl methacrylate; 4-hydroxybutylmeth-acrylate; 3,4-dihydroxybutyl methacrylate; 5-hydroxy-pentyl methacrylate; and 6-hydroxyhexyl methacrylate. The preferred hydroxy functional monomers for use in preparing the acrylic resins are hydroxy-substituted alkyl (meth) acrylates having a total of 5 to 7 carbon atoms, i.e., esters of $C_2$ to $C_3$ dihydric alcohols and acrylic or methacrylic acids. Illustrative of particularly suitable hydroxy-substituted alkyl (meth) acrylate monomers are 2-hydroxyethyl methacrylate, 2-hydroxyethyl acrylate, 2-hydroxybutyl acrylate, 2-hydroxypropyl methacrylate, and 2-hydroxypropyl acrylate.

Among the non-hydroxy-substituted alkyl (meth) acrylate monomers which may be employed are alkyl (meth) acrylates. Preferred nonhydroxy unsaturated monomers are esters of $C_1$ to $C_{12}$ monohydric alcohols and acrylic or methacrylic acids, e.g., methyl methacrylate, hexyl acrylate, 2-ethylhexyl acrylate, lauryl methacrylate, glycidyl methacrylate, etc. Examples of particularly suitable monomers are butyl acrylate, butyl methacrylate and methyl methacrylate.

Additionally, the acrylic copolymer polyol resins used in the present invention may include in their composition other monomers, such as monovinyl aromatic hydrocarbons containing from 8 to 12 carbon atoms (including styrene, alpha-methyl styrene, vinyl toluene, t-butyl styrene, chlorostyrene and the like), vinylidene chloride, acrylonitrile, epoxy-modified acrylics and methacrylonitrile.

The acrylic copolymer polyol preferably has a number average molecular weight not greater than about 20,000, more preferably between about 400 and about 15,000, and most preferably between about 800 and about 2000.

An exemplarly acrylic polyol may be made with the monomer blend having:

50% Butyl acrylate (BA)

28% 2-Hydroxyethyl methacrylate (HEMA)

15% Styrene

7% Methyl methacrylate (MMA) with an initiator, such as a tertiary butyl hydroperoxide, di-tertiary butyl and di-tertiary amyl peroxides, as part of the above monomer blend, makes a suitable acrylic polyol for the invention. Polymerization of these monomers is at about 76 to about 180° C. depending upon the solvent. Synthesis of suitable polymers is reported at Polymr. Mater Sci. Eng. 70, 1994, 159–163. Coatings having a higher proportion of the PHEA molecule will give better properties with acrylics with a higher proportion of butyl acrylate. Depending upon the time and temperature of the reaction, the $M_n$ of the acrylic polymer will be in the range of from about 2,000 to 10,000.

Alkyd polymers may be used as the polyol component of this invention. These alkyd resins have a number average molecular weight in the range of from about 500 to about 20,000, are oil modified polyester resins and are broadly the product of the reaction of a dihydric alcohol and a dicarboxylic acid or acid derivative and an oil, fat or carboxylic acid usually derived from such oil or fat which acts as a modifier. Such modifiers are preferably non-drying oils. The polyhydric alcohol employed is suitably an aliphatic alcohol, and mixtures of the alcohols also may be employed. The dicarboxylic acid, or corresponding anhydrides, may be selected from a variety of aliphatic carboxylic acids or mixtures of aliphatic and aromatic dicarboxylic acids. Suitable acids and acid anhydrides include, by way of example, succinic acid, adipic acid, phthalic anhydride, isophthalic acid, trimellitic acid (anhydride) and bis 3,3',4,4'-benzophenone tetracarboxylic anhydride. Mixtures of these acids and anhydrides may be employed to produce a balance of properties. As the drying oil or fatty acid there is suitably employed a predominately saturated fatty acid of 12 to 22 carbon atoms or a corresponding triglyceride, that is, a corresponding fat or oil, such as those contained in animal or vegetable fats or oils. Suitable fats and oils include coconut oil, lard, palm oil and beef tallow. Such fats and oils comprise mixed triglycerides of such fatty acids as caprylic, capric, lauric, myristic, palmitic, and stearic and such unsaturated fatty acids as oleic, erucic, ricinoleic, linoleic and linolenic. Chemically, these fats and oils are usually mixtures of two or more members of the class. Alkyd resins made with saturated monocarboxylic acids and fats are preferable because good weather resistance is of prime concern The following examples set forth compositions according to the invention and how to practice the invention.

EXAMPLE I

Materials

A phenolic ester alcohol (PHEA) having the structural formula E was obtained from Exxon Chemical Company as EXX-RD™ 100 Reactive Diluent. A isocyanurate derived from hexamethylene diisocyanate (HDI-IC) having the general structural formula

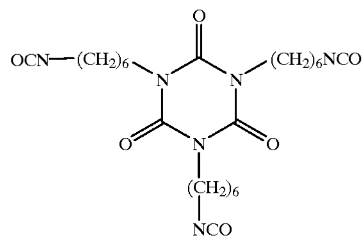

was supplied by Bayer as Desmodur™ N-3300. The MF crosslinker was a solventless monomeric hexakis (methoxymethyl) melamine (HMMM) type supplied by Cytec Industries, Inc. as Cymel™ 300. Methyl amyl ketone (MAK) was obtained from Union Carbide and dibutyl tin dilaurate (DBTDL) catalyst was obtained from Aldrich Chemical Company. Dinonylnapthalene sulfonic acid catalyst (DNNDSA) was obtained from King Industries as Nacure™ 155. A surface tension modifier, BYK™-302, was obtained from BYK-Chemie. Steel test panels were type R-36-1, obtained from Q-Panel Company.

Synthesis of Oligoester Diol.

In a 2-L, 4-neck flask with a stirrer, a Dean-Stark trap, a condenser, a thermometer with a temperature controller, a heating mantle, and a gas inlet and outlet was placed 326 g (1.88 mol) of dimethyl adipate, 301 g (1.88 mol) of dimethyl glutarate, 695 g (7.38 mol) of 1,4-butanediol and 0.13 g (0.01 wt. %) zinc acetate dihydrate. The mixture was blanketed with N, heated to 150° C. and then gradually to 200° C. during about 2 hours until 248 mL (82% of theoretical) of methanol had been collected in the Dean-Stark trap and no more was condensing. N flow was resumed and the temperature was increased to 220–240° C., and heating and stirring were continued for about 15 hours. 1,4-Butanediol (95 mL) was collected in the Dean-Stark trap. When the viscosity of the material in the flask indicated that the desired extent of reaction had been reached, heating was discontinued. The reaction mixture was cooled to yield 924 g of a pale yellow liquid. Its $M_n$ was determined to be 440 to 450 a.m.u. (different batches) by comparing the areas under the peaks at 3.6 ppm (—$CH_2OH$) and 4.0 ppm (—$CH_2OCO$) in its IH NMR spectrum.

Test Procedures.

Coatings were prepared by dissolving PHEA, oligoester diol, HMMM, and MAK in the desired proportions and then dissolving the HDI-IC and the catalysts as dilute solutions in MAK. For film property tests, catalyzed coatings were cast on steel panels using a #24 drawdown bar and were baked horizontally for 30 minutes in a forced air oven at 149° C., except as noted. Viscosity was measured at 25 and 35° C. on coatings without catalyst using a calibrated Brookfield viscometer Model LVDV-II$^+$ with spindle SC-31. Measurements were made 5 minutes after mixing HDI-IC into the coating.

For sag resistance tests, a modification of Procedure A of ASTM method D 4400- 89a (Reapproved 1993) was used. The coatings were mixed 5 minutes before testing. They were drawn down on Leneta type WK charts using a Leneta "multinotch application" with the charts in a horizontal position. The application makes a "ladder" of 10 stripes of coating varying from about 75 to 300 um in thickness. The striped charts were allowed to stand for 10 minutes in the horizontal position (to simulate "flashing") and were then baked for 30 minutes in a forced air oven preheated to 150° C. During baking, the chart was in the vertical position with the stripes sideways and the thinnest stripe on top. The anti-sag index was evaluated as described in ASTM D 4400.

Results

Optimization of Film Properties

Formulations with wide range of different proportions of ingredients were tested in order to optimize film mechanical properties. Representative formulations are shown in Table I.

Formula III in Table I has an excellent balance of film properties. As illustrated by formulas I, II, and IV, formulas with lower levels of HMMM give softer films, while those with higher levels of HMMM give harder films, but poorer impact resistance. Formula V, with high levels of HMMM and without HDI-IC, give hard and reasonably impact resistant films. In other experiments, it was demonstrated that film properties show little sensitivity to baking temperature in the range 121–163° C. DNNDSA catalyst level variations from 0.1 to 5.0 wt. % had surprisingly little affect on properties at 149° C. bakes.

Based on these results, a formula similar to III was selected for further study.

TABLE I

Formulas and Film Properties of Coatings

| Components | Parts per hundred by weight | | | | |
|---|---|---|---|---|---|
| | I | II | III | IV | V |
| Diol $M_n$ = 450 | 22.6 | 20.1 | 19.7 | 20.4 | 23.7 |
| PHEA | 22.6 | 20.1 | 19.7 | 20.4 | 23.7 |
| HMMM crosslinker | 6.4 | 7.5 | 13.5 | 20.2 | 31.4 |
| HDI-IC crosslinker | 27.9 | 30.1 | 29.3 | 20.2 | 0 |
| MAK | 19.5 | 20.9 | 17.0 | 18.0 | 20.4 |
| BYK-302 ™ | 0.5 | 0.4 | 0.4 | 0.4 | 0.5 |
| DBDTL | 0.04 | 0.03 | 0.03 | 0.04 | 0.04 |
| DNNDSA | 0.5 | 0.8 | 0.4 | 0.4 | 0.5 |
| Diol/PHEA, wt/wt | 1/1 | 1/1 | 1/1 | 1/1 | 1/1 |
| —NCO/aliphatic —OH | 1/1 | 1.3/1 | 1.3/1 | 0.8/1 | — |
| >$NCH_2OCH_3$/arom. —OH | 1.6/1 | 2.1/1 | 3.9/1 | 5.6/1 | 7.4/1 |
| Pencil Hardness | F | H | 2H | 3H | 3H |
| Adhesion | 5B | 5B | 5B | 5B | 5B |
| Impact resist. d/r | 160/160 | 160/160 | 160/160 | 120/80 | 140/100 |
| Solvent resist. | >200 | >200 | >200 | >200 | >200 |

Viscosity and Sag Resistance.

Formulas containing 21.6–21.8 parts per hundred by weight (PHR) of PHEA and of oligoester diol, 15.4–15.7 phr of HMMM, 30.6–31.0 phr of HDI-IC, 9.6–10.8 phr of MAK, and 0.4 phr of DNNDSA and 0.4 phr of BYK-302™ were prepared with varying levels of DBTDL catalyst. These formulas had a 1/1 wt. ratio of oligoester diol/PHEA, a ratio of 1.18 equivalents of —NCO per equivalent of aliphatic —OH and a ratio of 4.0 equivalents of >$NCH_2OCH_3$ per equivalent of phenolic —OH. Initial viscosity, time to double viscosity and anti-sag index are shown in Table II. All tests were performed five minutes after the samples were mixed; time to double viscosity includes the five minutes before the first measurement.

TABLE II

Viscosity, Rate of Viscosity Change, and Sag Index

| DBDTD, phr | Viscosity after 5 min. mPa.s | | Time to double viscosity, 25° C. | Anti-Sag |
|---|---|---|---|---|
| | 25° C. | 35° C. | minutes | Index |
| 0 | 375 | 255 | 72 | <3 |
| 0.004 | 400 | 315 | 55 | <3 |
| 0.009 | 415 | 330 | 32 | <3 |
| 0.01 | 455 | — | 28 | <3 |
| 0.05 | 475 | 340 | 14 | 3 |
| 0.07 | 495 | — | 12 | 6 |
| 0.10 | 515 | 350 | 10 | 9 |

The crude oven sagging test indicates that highly sag resistant sprayable coatings are possible. As expected, increasing the level of DBTDL catalyst sharply improves anti-sag index. Because formulas with high anti-sag indexes have short times to double viscosity, it would be necessary to apply them quickly after mixing, probably by using dual component spray equipment. Such equipment is available. Coatings with viscosities of 200–400 mPa.s are sprayable with commonly available equipment although 200 mPa.s are considered ideal. With advanced equipment, coatings with viscosities up to 2 Pa.s are said to be sprayable. With such equipment and with mild heating, solvent level of our formulations could be reduced.

EXAMPLE II

A coating composition was prepared from the following components:

| | Parts by Weight | |
|---|---|---|
| | A | B |
| **Component** | | |
| Acrylic resin (sold by S. C. Johnson as Joncryl ™ 500) | 22.9 | 19.6 |
| Phenolic ester alcohol (structure "E" sold by Exxon as Exx-RD ™ 100) | 22.9 | 19.6 |
| Melamine resin (sold by Cytek as Cymel ™ 300) | 16.5 | 14.1 |
| Triisocyanate resin (an isocyanate type sold by Bayer as Desmodur ™ N3300) | 6.8 | 9.2 |
| Di-/Triisocyanate resin (a uretdione/isocyanurate type sold by Bayer as Desmodur ™ N3400) | 24.7 | 32.3 |
| 2-heptanone | 6.2 | 5.3 |
| Flow additive (sold by Byk as Byk ™ 302) | 0.4 | 0.4 |
| Acid catalyst (Dinonyl naphthalene disulfonic acid, sold by King Industries) | 0.4 | 0.4 |
| Organotin catalyst (Dibutyl tin dilaurate, sold by Aldrich Chemical Co.) | 0.05 | 0.05 |
| **Formulation Characteristics** | | |
| Equivalent of isocyanate groups per equivalent of aliphatic hydroxyl groups | 1.2 | 1.8 |
| Equivalents of amino resin functional groups per equivalent of phenolic hydroxyl groups | 4 | 4 |
| Weight percent solids, tested at 110° C. for one hour | 88.7 | 91.5 |

The compositions were cast on a steel panel using the procedure described in Example I and baked at 149° C. for 30 minutes. The cured films were glossy and transparent. Their properties were:

| | A | B |
|---|---|---|
| Film thickness range, mil. | 1.3–1.9 | 1.3–1.8 |
| Adhesion | 5B | 5B |
| Pencil hardness | 3H/4H | 2H |
| Tukon hardness, knoops | 20 | 17 |
| Direct impact resistance, in-lb | 20 | 30 |
| Reverse impact resistance, in-lb | 0 | 10 |
| Solvent rub resistance, double rubs w/non-woven paper lab towel saturated w/2-butanone | >200 | >200 |

Although the invention has been described with regard to its important aspects, it should be understood that various changes and modifications as would be obvious to one having the ordinary skill in this art may be made without departing from the scope of the invention which is set forth in the claims appended hereto.

What is claimed is:

1. A clear, topcoat coating composition which is effective for application over a pigmented basecoat composition, the topcoat coating composition comprising a polymeric vehicle which comprises:

a phenolic ester compound selected from the group consisting of a phenolic ester alcohol having the structural formula

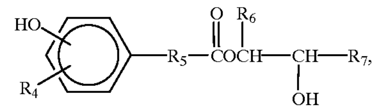

phenolic urethane having the structural formula

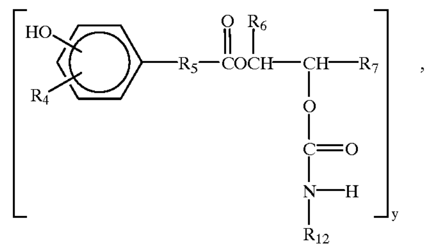

a phenolic blocked isocyanate having the structural formula (a)

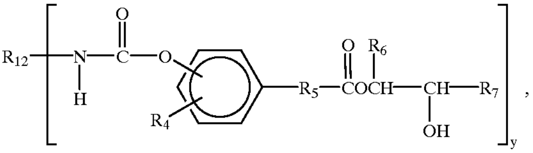

phenolic blocked isocyanates having the structural formula (b)

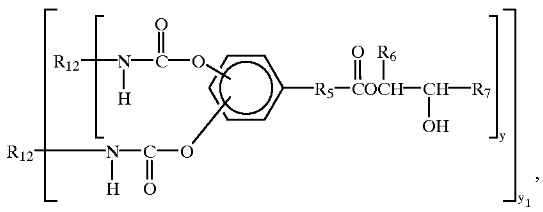

and mixtures thereof, wherein $R_4$ is selected from the group consisting of hydrogen, halogen, hydroxyl, $C_1$ to $C_8$ alkyl and $C_1$ to $C_8$ alkoxy, $R_5$ is selected from the group consisting of a direct bond, $C_1$ to $C_{20}$ organic radical having only carbon and hydrogen atoms, and a $C_1$ to $C_{20}$ organic radical which includes in its structure a substitution group selected from the group consisting of phenol, aliphatic hydroxyl, ester, ether, carbonate and combinations thereof, $R_6$ is selected from the group consisting of hydrogen, a $C_1$ to $C_{20}$ organic radical, and a $C_1$ to $C_{20}$ organic radical which includes in its structure at least one ester linkage or a direct bond which forms with $R_7$ part of a 5 or 6 carbon atom cyclic ring structure, $R_7$ is $CH_2R_8$ wherein $R_8$ is selected from the group consisting of hydroxy, $OR_9$, $$-O\overset{O}{\overset{\|}{C}}R_{10}$$

and $R_{11}$, wherein $R_9$ is selected from the group consisting of a primary aliphatic group containing 3 to 20 carbon atoms, a secondary aliphatic group containing 3 to 20 carbon atoms, an aromatic group containing 6 to 20 carbon atoms, a primary aliphatic group containing 3 to 20 carbon atoms which includes at least one ester linkage and a secondary aliphatic group containing 3 to 20 carbon atoms which includes at least one ester linkage, wherein $R_{10}$, is selected from the group consisting of a primary aliphatic group containing 4 to 20 carbon atoms, a secondary aliphatic group containing 4 to 20 carbon atoms, a tertiary aliphatic group containing 4 to 20 carbon atoms, an aromatic group containing 6 to 20 carbon atoms and combinations thereof, wherein the primary, secondary and tertiary aliphatic groups include at least one ester linkage, and wherein $R_{11}$ is selected from the group consisting of a $C_2$ to $C_{20}$ organic radical, a $C_2$ to $C_{20}$ organic radical which includes in its structure at least one ester linkage, a $C_2$ to $C_{20}$ organic radical which forms with $R_6$ part of a 5 or 6 carbon atom cyclic ring structure, where y=1 to 20, $y_1$=1 to 4 and where $R_{12}$ is selected from the group consisting of alkyl, an alkyl difunctional radical, alkenyl, alkenyl difunctional radical, aromatic and an aromatic difunctional radical and wherein the molecular weight of the phenolic ester alcohol is not more than about 1500 and the molecular weights of the phenolic urethane and phenolic blocked isocyanate are not more than about 50,000;

a crosslinker blend comprising a polyisocyanate compound and an amino resin; and a polyol which is not a phenolic ester alcohol and is selected from the group consisting of a polyester polyol, an acrylic polyol, an alkyd polyol and mixtures thereof, the phenolic ester compound, crosslinker blend and polyol being in amounts which are effective for providing a cured clearcoat coating binder having a Tukon hardness of at least about 5 knoops at a film thickness of about 1.0 mil dry.

2. A clear topcoat coating composition as recited in claim 1, wherein the polymeric vehicle comprises at least about 0.3 equivalents of isocyanate functionality for about one equivalent of aliphatic hydroxyl in the polymeric vehicle and which isocyanate functionality is effective for reacting with the polyol and the hydroxyl functionality of the phenolic ester compound, and wherein the composition comprises from about 1.9 to about 12 equivalents of amino resin functional groups for every one equivalent of phenolic hydroxy and which amino resin functionality is effective for reacting with the polyol and the phenol hydroxyl functionality of the phenolic ester compound.

3. A clear topcoat coating composition as recited in claim 2, wherein the crosslinker blend has from about 0.8 to about 1.8 equivalents of isocyanate funtionality for one equivalent of aliphatic hydroxyl in the polymeric vehicle and from about 3 to about 5 equivalents of amino funtionality per equivalent of phenolic hydroxyl in the polymeric vehicle.

4. A clear topcoat coating composition as recited in claim 1, wherein polymeric vehicle comprises from about 40 to about 65 weight percent polyol, based upon the weight of the polymeric vehicle, from about 8 to about 50 weight percent phenolic urethane, based upon the weight of the polymeric vehicle, and from about 20 to about 50 weight percent crosslinker blend, based upon the weight of the polymeric vehicle.

5. A clear topcoat coating composition as recited in claim 1, wherein polymeric vehicle comprises from about 40 to about 65 weight percent polyol, based upon the weight of the polymeric vehicle, from about 5 to about 40 weight percent phenolic blocked isocyanate of formulas (a) and/or (b), based upon the weight of the polymeric vehicle, and from about 20 to about 50 weight percent crosslinker blend, based upon the weight of the polymeric vehicle.

6. A clear topcoat coating composition as recited in claim 1, wherein polymeric vehicle comprises from about 30 to about 70 weight percent polyol, based upon the weight of the polymeric vehicle, from about 5 to about 50 weight percent phenolic ester alcohol, based upon the weight of the polymeric vehicle, and from about 25 to about 50 weight percent crosslinker blend, based upon the weight of the polymeric vehicle.

7. A clear topcoat composition as recited in claim 1, wherein the polymeric vehicle comprises a phenolic urethane having the structural formula

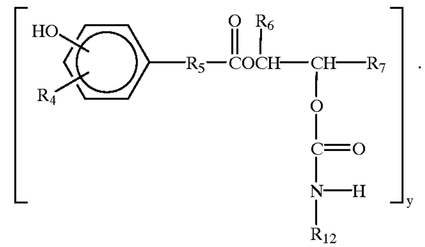

8. A polymeric vehicle which is effective for providing a clear topcoat coating binder having a Tukon hardness of at least about 5 knoops, the polymeric vehicle comprising:

a phenolic ester alcohol having the structural formula

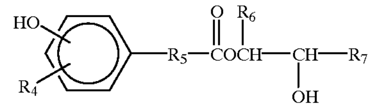

a crosslinker blend comprising a polyisocyanate compound and an amino resin; and a polyol which is not a phenolic ester alcohol and is selected from the group consisting of a polyester polyol, an acrylic polyol, an alkyd polyol and mixtures thereof, the polyol having a number average molecular weight of not more than about 20,000, the polymeric vehicle effective for providing a coating binder with from about 0.7 to about 20 weight percent, based upon the weight of the polymeric vehicle before crosslinking, carbamate linkages upon curing the polymeric vehicle and the polymeric vehicle comprising from about 1.9 to about 12 equivalent of aminoresin functional groups for every one equivalent of phenolic hydroxy in the polymeric vehicle and which amino resin functionality is effective for reacting with the polyol and the phenol hydroxyl functionality of the phenolic ester alcohol and $R_4$ is selected from the group consisting of hydrogen, halogen, hydroxyl, $C_1$ to $C_8$ alkyl and $C_1$ to $C_8$ alkoxy, $R_5$ is selected from the group consisting of a direct bond, $C_1$ to $C_{20}$ organic radical having only carbon and hydrogen atoms, and a $C_1$ to $C_{20}$ organic radical which includes in its structure a substitution group selected from the group consisting of phenol, aliphatic hydroxyl, ester, ether, carbonate and combinations thereof, $R_6$ is selected from the group consisting of hydrogen, a $C_1$ to $C_{20}$ organic radical, and a $C_1$ to $C_{20}$ organic radical which includes in its structure at least one ester linkage or a direct bond which forms with $R_7$ part of a 5 or 6 carbon atom cyclic ring structure, $R_7$ is $CH_2R_8$ wherein $R_8$ is selected from the group consisting of hydroxy, $OR_9$, $$-O-\overset{O}{\overset{\|}{C}}-R_{10}$$

and $R_{11}$, wherein $R_9$ is selected from the group consisting of a primary aliphatic group containing 3 to 20 carbon atoms, a secondary aliphatic group containing 3 to 20 carbon atoms, an aromatic group containing 6 to 20 carbon atoms, a primary aliphatic group containing 3 to 20 carbon atoms which includes at least one ester linkage and a secondary aliphatic group containing 3 to 20 carbon atoms which includes at least one ester linkage, wherein $R_{10}$ is selected from the group consisting of a primary aliphatic group containing 4 to 20 carbon atoms, a secondary aliphatic group containing 4 to 20 carbon atoms, a tertiary aliphatic group containing 4 to 20 carbon atoms, an aromatic group containing 6 to 20 carbon atoms and combinations thereof, wherein the primary, secondary and tertiary aliphatic groups include at least one ester linkage, and wherein $R_{11}$ is selected from the group consisting of a $C_2$ to $C_{20}$ organic radical, a $C_2$ to $C_{20}$ organic radical which includes in its structure at least one ester linkage, a $C_2$ to $C_{20}$ organic radical which forms with $R_6$ part of a 5 or 6 carbon atom cyclic ring structure and wherein the molecular weight of the phenolic ester alcohol is not more than about 1500.

9. A polymeric vehicle as recited in claim 8, wherein the crosslinker blend has from about 0.8 to about 1.8 equivalents of isocyanate funtionality for one equivalent of aliphatic hydroxyl in the polymeric vehicle and from about 3 to about 5 equivalents of amino funtionality per equivalent of phenolic hydroxyl in the polymeric vehicle.

10. A polymeric vehicle as recited in claim 8, wherein polymeric vehicle comprises from about 30 to about 70 weight percent polyol, based upon the weight of the polymeric vehicle, from about 5 to about 50 weight percent phenolic ester alcohol, based upon the weight of the polymeric vehicle, and from about 25 to about 50 weight percent crosslinker blend, based upon the weight of the polymeric vehicle.

11. A polymeric vehicle as recited in claim 8 wherein the phenolic ester alcohol is

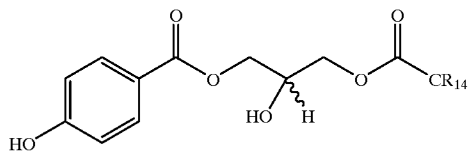

wherein $R_{14}$ is an alkyl having 8 carbon atoms.

12. A polymeric vehicle which is effective for providing a clear topcoat coating binder having a Tukon hardness of at least about 5 knoops, the polymeric vehicle comprising:

phenolic urethane having the structural formula

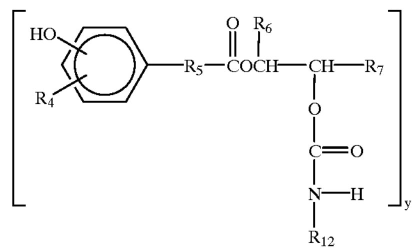

an amino crosslinking resin;

a polyol which is not a phenolic ester alcohol and is selected from the group consisting of a polyester polyol, an acrylic polyol, an alkyd polyol and mixtures thereof, the polyol having a number average molecular weight of not more than about 20,000, the polymeric vehicle effective for providing a coating binder with from about 0.7 to about 20 weight percent, based upon the weight of the polymeric vehicle before crosslinking, carbamate linkages upon curing the polymeric vehicle and the polymeric vehicle comprising from about 1.9 to about 12 equivalent of amino resin functional groups for every one equivalent of phenolic hydroxy in the polymeric vehicle and which amino resin functionality is effective for reacting with the polyol and the phenol hydroxyl functionality of the phenolic urethane and $R_4$ is selected from the group consisting of hydrogen, halogen, hydroxyl, $C_1$ to $C_8$ alkyl and $C_1$ to $C_8$ alkoxy, $R_5$ is selected from the group consisting of a direct bond, $C_1$ to $C_{20}$ organic radical having only carbon and hydrogen atoms, and a $C_1$ to $C_{20}$ organic radical which includes in its structure a substitution group selected from the group consisting of phenol, aliphatic hydroxyl, ester, ether, carbonate and combinations thereof, $R_6$ is selected from the group consisting of hydrogen, a $C_1$ to $C_{20}$ organic radical, and a $C_1$ to $C_{20}$ organic radical which includes in its structure at least one ester linkage or a direct bond which forms with $R_7$ part of a 5 or 6 carbon atom cyclic ring structure, $R_7$ is $CH_2R_8$ wherein $R_8$ is selected from the group consisting of hydroxy, $OR_9$, $$-O-\overset{O}{\overset{\|}{C}}-R_{10}$$

and $R_{11}$, wherein $R_9$ is selected from the group consisting of a primary aliphatic group containing 3 to 20 carbon atoms, a secondary aliphatic group containing 3 to 20 carbon atoms, an aromatic group containing 6 to 20 carbon atoms, a primary aliphatic group containing 3 to 20 carbon atoms which includes at least one ester linkage and a secondary aliphatic group containing 3 to 20 carbon atoms which includes at least one ester linkage, wherein $R_{10}$ is selected from the group consisting of a primary aliphatic group containing 4 to 20 carbon atoms, a secondary aliphatic group containing 4 to 20 carbon atoms, a tertiary aliphatic group containing 4 to 20 carbon atoms, an aromatic group containing 6 to 20 carbon atoms and combinations thereof, wherein the primary, secondary and tertiary aliphatic groups include at least one ester linkage, and wherein $R_{11}$ is selected from the group consisting of a $C_2$ to $C_{20}$ organic radical, a $C_2$ to $C_{20}$ organic radical which includes in its structure at least one ester linkage, a $C_2$ to $C_{20}$ organic radical which forms with $R_6$ part of a 5 or 6 carbon atom cyclic ring structure, where $R_{12}$ is selected from the group consisting of alkyl, an alkyl difunctional radical, alkenyl, alkenyl difunctional radical, aromatic and an aromatic difunctional radical and wherein the molecular weight of the phenolic urethane is not more than about 50,000.

13. A polymeric vehicle as recited in claim 12, wherein the polymeric vehicle further includes an isocyanate compound to provide a crosslinker blend and the amino resin in the crosslinker blend is in an amount effective for providing from about 3 to about 5 equivalents of amino funtionality per equivalent of phenolic hydroxyl in the polymeric vehicle.

14. A polymeric vehicle as recited in claim 13, wherein polymeric vehicle comprises from about 40 to about 65 weight percent polyol, based on the weight of the polymeric vehicle, from about 8 to about 50 weight percent phenolic urethane, based on the weight of the polymeric vehicle and from about 20 to about 50 weight percent crosslinker blend based on the weight of the polymeric vehicle.

15. A polymeric vehicle as recited in claim 12 wherein the phenolic urethane is

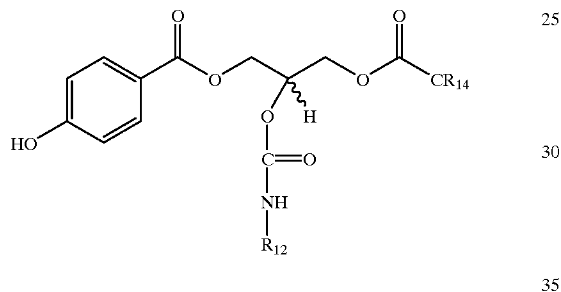

wherein $R_{14}$ is an alkyl having 8 carbon atoms.

16. A polymeric vehicle which is effective for providing a clear topcoat coating binder having a Tukon hardness of at least about 5 knoops, the polymeric vehicle comprising:

phenolic blocked isocyanates having the structural formula

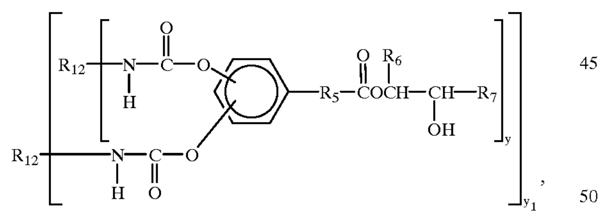

an amino crosslinking resin; and a polyol which is not a phenolic ester alcohol and is selected from the group consisting of a polyester polyol, an acrylic polyol, an alkyd polyol and mixtures thereof, the polyol having a number average molecular weight of not more than about 20,000, the polymeric vehicle effective for providing a coating binder with from about 0.7 to about 20 weight percent, based upon the weight of the polymeric vehicle before crosslinking, carbamate linkages upon curing the polymeric vehicle and the polymeric vehicle comprising from about 1.9 to about 12 equivalent of amino resin functional groups for every one equivalent of a deblocked phenolic hydroxy in the polymeric vehicle and which amino resin functionality is effective for reacting with the polyol and the phenol hydroxyl functionality which results from deblocking of the phenolic blocked isocyanate wherein $R_4$ is selected from the group consisting of hydrogen, halogen, hydroxyl, $C_1$ to $C_8$ alkyl and $C_1$ to $C_8$ alkoxy, $R_5$ is selected from the group consisting of a direct bond, $C_1$ to $C_{20}$ organic radical having only carbon and hydrogen atoms, and a $C_1$ to $C_{20}$ organic radical which includes in its structure a substitution group selected from the group consisting of phenol, aliphatic hydroxyl, ester, ether, carbonate and combinations thereof, $R_6$ is selected from the group consisting of hydrogen, a $C_1$ to $C_{20}$ organic radical, and a $C_1$ to $C_{20}$ organic radical which includes in its structure at least one ester linkage or a direct bond which forms with $R_7$ part of a 5 or 6 carbon atom cyclic ring structure, $R_7$ is $CH_2R_8$ wherein $R_8$ is selected from the group consisting of hydroxy, $OR_9$, $$\overset{\displaystyle O}{\overset{\|}{OCR_{10}}}$$

and $R_{11}$, wherein $R_9$ is selected from the group consisting of a primary aliphatic group containing 3 to 20 carbon atoms, a secondary aliphatic group containing 3 to 20 carbon atoms, an aromatic group containing 6 to 20 carbon atoms, a primary aliphatic group containing 3 to 20 carbon atoms which includes at least one ester linkage and a secondary aliphatic group containing 3 to 20 carbon atoms which includes at least one ester linkage, wherein $R_1O$ is selected from the group consisting of a primary aliphatic group containing 4 to 20 carbon atoms, a secondary aliphatic group containing 4 to 20 carbon atoms, a tertiary aliphatic group containing 4 to 20 carbon atoms, an aromatic group containing 6 to 20 carbon atoms and combinations thereof, wherein the primary, secondary and tertiary aliphatic groups include at least one ester linkage, and wherein $R_{11}$ is selected from the group consisting of a $C_2$ to $C_{20}$ organic radical, a $C_2$ to $C_{20}$ organic radical which includes in its structure at least one ester linkage, a $C_2$ to $C_{20}$ organic radical which forms with $R_6$ part of a 5 or 6 carbon atom cyclic ring structure, where y=1 to 20, $y_1$=1 to 4 and where $R_{12}$ is a residue of a multifunctional isocyanate compound and wherein the molecular weight of the phenolic blocked isocyanate is not more than about 50,000.

17. A polymeric vehicle which is effective for providing a clear topcoat coating binder having a Tukon hardness of at least about 5 knoops, the polymeric vehicle comprising:

phenolic blocked isocyanates having the structural formula

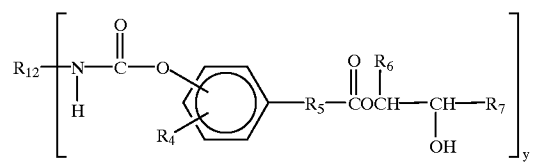

an amino crosslinking resin; and a polyol which is not a phenolic ester alcohol and is selected from the group consisting of a polyester polyol, an acrylic polyol, an alkyd polyol and mixtures thereof, the polyol having a number average molecular weight of not more than about 20,000, the polymeric vehicle effective for providing a coating binder with from about 0.7 to about 20 weight percent, based upon the weight of the polymeric vehicle before crosslinking, carbamate linkages upon curing the polymeric vehicle and the polymeric vehicle comprising from about 1.9 to about 12 equivalent of amino resin functional groups for every one equivalent of a deblocked phenolic hydroxy in the polymeric vehicle and which amino resin functionality is effective for reacting with the polyol and the phenol hydroxyl functionality which results from deblocking of the phenolic blocked isocyanate wherein $R_4$ is selected from the group consisting of hydrogen, halogen, hydroxyl, $C_1$ to $C_8$ alkyl and $C_1$ to $C_{20}$ alkoxy, $R_5$ is selected from the group consisting of a direct bond, $C_1$ to $C_{20}$ organic radical having only carbon and hydrogen atoms, and a $C_1$ to $C_{20}$ organic radical which includes in its structure a substitution group selected from the group consisting of phenol, aliphatic hydroxyl, ester, ether, carbonate and combinations thereof, $R_6$ is selected from the group consisting of hydrogen, a $C_1$ to $C_{20}$ organic radical, and a $C_1$ to $C_{20}$ organic radical which includes in its structure at least one ester linkage or a direct bond which forms with $R_7$ part of a 5 or 6 carbon atom cyclic ring structure, $R_7$ is $CH_2R_8$ wherein $R_8$ is selected from the group consisting of hydroxy, $OR_9$, $$-O-\overset{O}{\overset{\|}{C}}-R_{10}$$

and $R_{11}$, wherein $R_9$ is selected from the group consisting of a primary aliphatic group containing 3 to 20 carbon atoms, a secondary aliphatic group containing 3 to 20 carbon atoms, an aromatic group containing 6 to 20 carbon atoms, a primary aliphatic group containing 3 to 20 carbon atoms which includes at least one ester linkage and a secondary aliphatic group containing 3 to 20 carbon atoms which includes at least one ester linkage, wherein $R_{10}$ is selected from the group consisting of a primary aliphatic group containing 4 to 20 carbon atoms, a secondary aliphatic group containing 4 to 20 carbon atoms, a tertiary aliphatic group containing 4 to 20 carbon atoms, an aromatic group containing 6 to 20 carbon atoms and combinations thereof, wherein the primary, secondary and tertiary aliphatic groups include at least one ester linkage, and wherein $R_{11}$ is selected from the group consisting of a $C_2$ to $C_{20}$ organic radical, a $C_2$ to $C_{20}$ organic radical which includes in its structure at least one ester linkage, a $C_2$ to $C_{20}$ organic radical which forms with $R_6$ part of a 5 or 6 carbon atom cyclic ring structure, where y=1 to 20, and where $R_{12}$ is a residue of a multifunctional isocyanate compound and wherein the molecular weight of the phenolic blocked isocyanate is not more than about 50,000.

18. A polymeric vehicle as recited in claims 16 or 17, wherein the polymeric vehicle further includes an isocyanate compound to provide a crosslinker blend and the amino resin in the crosslinker blend is in an amount effective for providing from about 3 to about 5 equivalents of amino functionality per equivalent of deblocked phenolic hydroxyl in the polymeric vehicle.

19. A polymeric vehicle as recited in claim 18, wherein polymeric vehicle comprises from about 40 to about 65 weight percent polyol, based upon the weight of the polymeric vehicle, from about 5 to about 40 weight percent phenolic blocked isocyanate, based upon the weight of the polymeric vehicle, and from about 20 to about 50 weight percent crosslinker blend, based upon the weight of the polymeric vehicle.

20. A polymeric vehicle as recited in claim 17 wherein the phenolic blocked isocyanate is

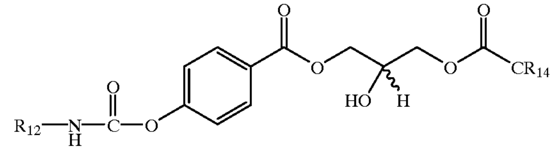

wherein $R_{14}$ is an alkyl having 8 carbon atoms.

* * * * *